Dec. 1, 1953

G. M. GEIGER 2,661,017

PILOT OPERATED VALVE

Filed Jan. 27, 1949

INVENTOR
GEORGE M. GEIGER
BY
*W. S. McDowell*
ATTORNEY

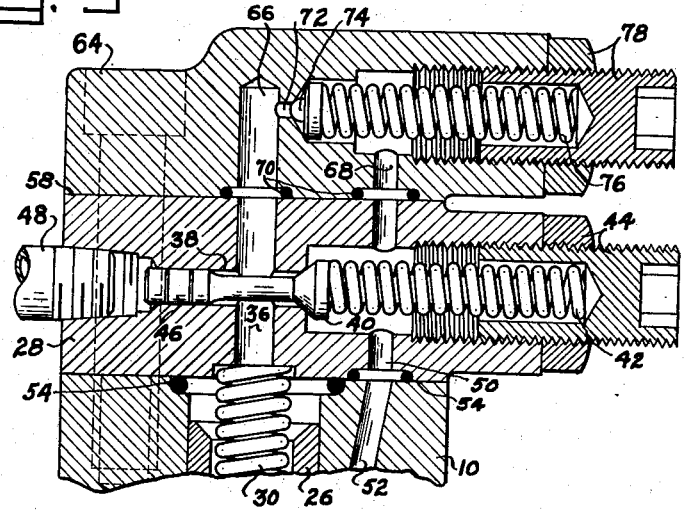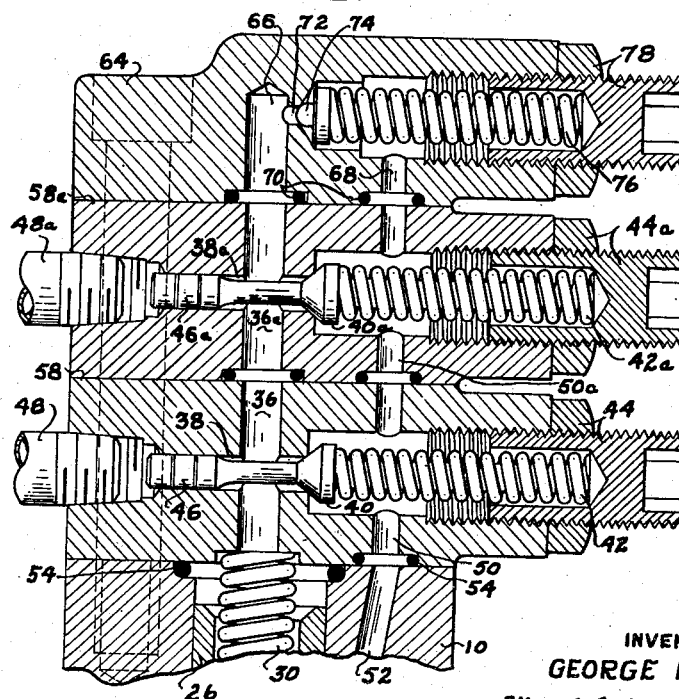

Patented Dec. 1, 1953

2,661,017

UNITED STATES PATENT OFFICE 2,661,017

PILOT OPERATED VALVE

George M. Geiger, Mount Gilead, Ohio, assignor to H-P-M Development Corporation, Mount Gilead, Ohio, a corporation of Delaware Application January 27, 1949, Serial No. 73,126

1 Claim. (Cl. 137—491)

This invention relates to valves and particularly to pilot operated valves.

With the increasing adaptation of hydraulic power to machine tools and the like there has been an attendant increase in complexity of the hydraulic circuits involving the design and use of a great many control valves. Such valves include relief valves, bypass valves, unloading valves, sequencing valves, admission valves, and many other valves of various types which must be included in the circuit for the proper control of the driven elements.

Due to the fact that such circuits are usually independently designed, the suppliers of hydraulic systems must maintain a fairly heavy inventory of valves at all times in order to meet the various requirements of the purchasers of hydraulic circuits.

Not only must a heavy inventory be carried, but the producer of valves is also required to maintain the proper tooling, including machines for manufacturing the said valves, and maintain the other appurtenances to proper production such as complete and detailed records of the valve construction, drawings, specifications, and so forth.

One of the primary objects of the present invention is to provide a type of valve which shall have a great many uses in a hydraulic circuit thereby substantially simplifying the problem of making complex hydraulic system installations.

A still further object of this invention is the provision of a basic valve design having substantially universal application in certain situations, and being adaptable for its several uses by means of exchangeable pilot valves in connection therewith.

A still further object of this invention is the provision of a valve construction including a pilot valve operator such that the said operators may be manifolded in connection with the valve for operating it from a plurality of stimuli.

It is also an object of this invention to provide a simplified valve construction having a plurality of uses and a simplified pilot valve arrangement for use therewith such that by stocking a minimum of parts a valve manufacturer can supply a plurality of different types of valves.

These and other objects and advantages will become more apparent upon reference to the following description taken in connection with the accompanying drawings in which:

Figure 3 is a vertical section through the upper end of a valve according to this invention and showing a pair of pilot units manifolded therewith; and Figure 4 is a view similar to Figure 3 and showing how three or more pilot units can be manifolded with the valve.

Figure 1:
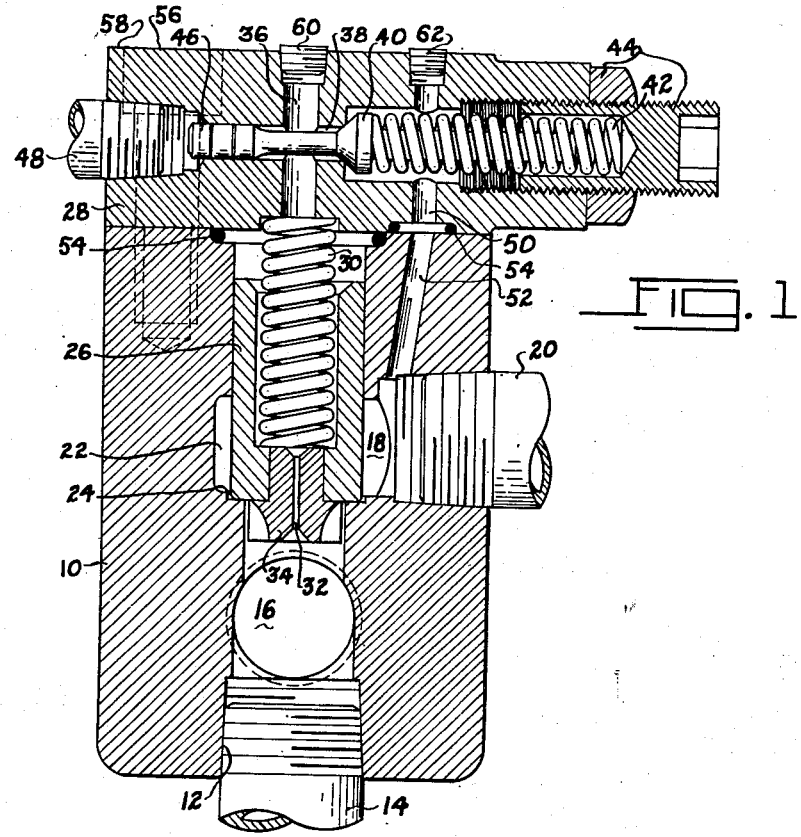
Figure 1 is a vertical section taken through a valve constructed according to this invention and as indicated by the line 1—1 on Figure 2.

Referring to the drawings the valve shown in Figure 1 comprises a body 10 having an inlet port 12 to which is connected a conduit 14. The inlet port 12 may be a part of an inlet manifold 16 extending through the valve body and having laterally opening ports which are provided to simplify connecting the valve in the hydraulic circuit in certain instances.

The valve also has an outlet port 18 having connected therewith a conduit 20. A valve bore 22 extends between the inlet and outlet ports and includes a seat at 24.

A valve member 26 is slidable in the bore 22 and has an end part facing the inlet port 12 adapted for engagement with the seat 24 for disconnecting the inlet and outlet ports.

The upper end of the bore 22 is closed by the body 28 of a pilot valve thereby providing an operating chamber within which the upper end of the valve 26 is disposed. A spring 30 in the said chamber bears between the body 28 of the pilot valve and the valve member 26 and continuously urges the latter downwardly against the seat 24.

For assisting the spring 30 in maintaining the valve member in its port disconnecting position there is a restricted bore 32 extending through a member 34 carried in the lower end of the valve member 26 and which restrictedly interconnects the opposite ends of the said valve member.

The member 34 is tapered to provide more or less streamline flow of fluid passing through the valve in order to reduce the turbulence thereof which would result in heating, fluctuating pressures, and noisy operation of the valve.

It will be apparent that when the valve member 26 is seated against the seat 24 the thrust of the upper end of the valve member downwardly is somewhat greater than the thrust of the lower end of the valve member upwardly due to the pressures in the inlet port and the aforementioned operating chamber so that the valve member 26 is positively held against the seat 24.

For operating the valve member into its port connecting position, the chamber at the upper end of the bore 22 is adapted for being exhausted through the pilot valve mounted on the upper end of the body 10. To this end, the pilot valve has a channel 36 extending therethrough and communicating with the chamber at the upper end of the bore 22. The channel 36 is intercepted by a second channel 38 extending laterally through the body 28 and normally closed by a valve member 40.

The valve member 40 is urged toward its closing position by a spring 42 which is adjustable by the screw and lock nut arrangement 44 and is adapted for being urged toward open position by pressure conducted to the piston end 46 through the pilot conduit 48.

The channel 38 is intercepted by a third channel in the pilot valve indicated at 50 and which is in communication with the passage 52 in the body 10 leading to the outlet port 18.

For preventing leakage at the points where the channels 36 and 50 communicate with the passages in the body 10, there are preferably provided resilient annular sealing rings 54 which are compressed when the body 28 of the pilot valve is mounted on the body 10 of the main valve and secured thereto as by the cap screws 56.

It will be apparent that the valve shown in Figure 1 will have the valve member 26 thereof in its port disconnecting position irrespective of the pressure of the inlet port 12 until sufficient pressure is supplied to the piston 46 through the pilot conduit 48 to move the valve member 46 rightwardly to interconnect the channels 36 and 50 whereby the chamber above the valve member 26 will be exhausted.

The exhausting of the said chamber permits the pressure at the inlet port 12 to move the valve member 26 upwardly whereupon the ports 12 and 18 become interconnected. Due to the restricted bore 32 the valve member 26 will remain open until the valve member 40 moves to its closed position by a decrease in pressure acting on the piston 46.

As will be seen in Figure 1 both of the channels 36 and 50 pass completely through the body 28 of the pilot valve and the upper surface of the pilot valve is finished flat as indicated at 58. By so arranging the pilot valve operator for the main valve the pilot unit may be augmented by an additional pilot operator as indicated in Figure 3.

Figure 2:
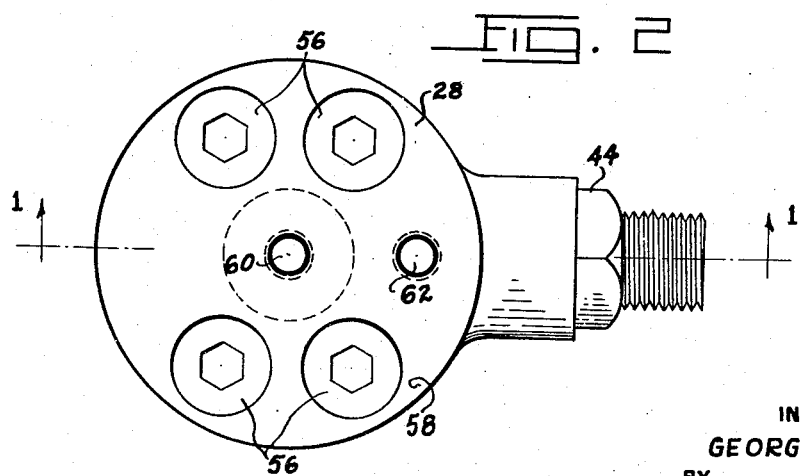
Figure 2 is a plan view of the valve shown in Figure 1.

In Figure 3, the parts of the main valve and the pilot operator therefor mounted immediately on the main valve body bear numerals corresponding to those on the valve in Figures 1 and 2. However, the plugs 60 and 62 which in Figure 1 are employed for closing the channels 36 and 50 respectively, are removed and a second pilot operator 64 is mounted on top of the body 28 of the other pilot operator.

By providing the pilot operator 64 with the channel 66 in alignment with the channel 36 and the channel 68 in alignment with the channel 50, the main valve may be operated by the actuation of either of the pilot units mounted thereon.

The sealing between the two pilot units is accomplished by the resilient annular rings 70 which correspond to the rings indicated at 54 in Figure 1.

The operator 64 in Figure 3 includes a channel 72 interconnecting the channels 66 and 68 and normally closed by a ball 74 spring urged toward its closing position by the spring 76 which is adjustable by the adjusting screw and nut combination at 78.

It will be apparent that the main valve in Figure 3 may be operated either in response to the supply of pilot fluid to the piston 46 of the lower pilot operator, or by the development of a predetermined pressure in the upper end of the valve bore 22. This permits the valve to be used both as a relief valve and as a pilot operated admission, sequencing, unloading, or bypass valve.

In Figure 4 an arrangement is shown which is similar to that in Figure 3 except that interposed between the two pilot operators shown in Figure 3 there is a second operator adapted to be actuated by pilot fluid. This operator is substantially identical with that shown in Figure 1 and the lower of the pilot operators in Figure 3 and bears corresponding numerals with the addition of a subscript "a."

It will be apparent that the arrangement of Figure 4 is adapted for operating the main valve either in response to a predetermined maximum pressure supplied thereto, or by either of two pilot pressures supplied to the lower and intermediate pilot operators. This arrangement enables the main valve to be employed as a relief valve, as a pilot operated sequencing, admission, unloading, or bypass valve, or as a double pilot operated valve for enabling the main valve to be opened at any pair of preselected pilot pressures.

It will be evident that a valve constructed according to this invention and having available a plurality of pilot units therefor could be adapted to many different uses in a hydraulic system.

By providing means for manifolding the units on the valve a single valve can be employed in a system for several different means. This materially reduces the inventory which the valve manufacturer must carry and likewise simplifies the problems of repair and replacement of elements already in service.

It will be understood that this invention is susceptible to modification in order to adapt it to different usages and conditions and, accordingly, it is desired to comprehend such modifications within this invention as may fall within the scope of the appended claim.

I claim:

A combined pilot operated and pressure relief valve comprising a main valve casing formed with a cylindrical valve chamber terminating at one end in a shouldered valve seat and opening at its opposite end on an exterior surface of said main casing, an inlet port for said valve formed as a continuation of the valve seat end of said chamber, and an outlet port intersecting said valve chamber in spaced relation to said inlet port; a valve member carried in the valve chamber of said main casing and movable axially therein into and out of engagement with said valve seat to control the flow of fluid between said inlet and outlet ports, said valve member having opposed pressure-responsive faces thereon and a restricted orifice establishing restricted fluid communication between said faces, one of the pressure-responsive faces of said valve member and said restricted orifice being in direct fluid communication with the inlet port of said main casing; a pilot valve casing mounted on the exterior surface of said main valve casing in closing relation to the said opposite end of the valve chamber of said main valve casing, said pilot valve casing having a fluid passage therein disposed in axial alignment and communicating with the said opposite end of the valve chamber of said main valve casing, a valve bore intersecting said fluid passage, an exhaust outlet communicating with said valve bore in spaced relation to said fluid passage, and a fluid inlet connection formed at one end of said valve bore for connection with a source of fluid pressure; a fluid-pressure-responsive valve carried in said valve bore and arranged to normally interrupt communication between said fluid passage and said exhaust outlet, but movable in response to fluid pressures introduced within said fluid inlet connection to open said valve bore and establish fluid communication between said fluid passage and said exhaust outlet; a pressure relief valve casing mounted on said pilot valve casing and formed with a fluid passage disposed in axial alignment and communicating with the fluid passage of said pilot valve casing, a valve chamber communicating with the fluid passage of said pressure relief valve, and an exhaust outlet communicating with the valve chamber of said relief valve casing in spaced relation to the fluid passage thereof; and a spring-pressed valve member arranged in the valve chamber of said relief valve casing between the fluid passage and exhaust outlet thereof to normally interrupt communication between the fluid passage and exhaust outlet of said relief valve casing, but being movable in response to a given high fluid pressure within the fluid passage of said relief valve casing to connect the fluid passage of said relief valve casing with the exhaust outlet thereof, movement of either of the valve members of said pilot valve casing and said pressure relief valve casing to an open position serving to decrease fluid pressures on the side of the valve member of said main valve casing opposite the fluid inlet thereof to permit fluid pressure within the fluid inlet of said main valve casing to move the valve member thereof to an unseated position and thereby connect the inlet port of said main valve casing with the outlet port thereof.

GEORGE M. GEIGER.

References Cited in the file of this patent

UNITED STATES PATENTS

| Number | Name | Date |
|---|---|---|
| 687,273 | Schoeffel et al. | Nov. 26, 1901 |
| 1,560,567 | Grant | Nov. 10, 1925 |
| 2,238,768 | Berglund | Apr. 15, 1941 |
| 2,250,389 | Miller | July 22, 1941 |

FOREIGN PATENTS

| Number | Country | Date |
|---|---|---|
| 720,860 | France | Dec. 12, 1931 |